(12) United States Patent
Karlsson et al.

(10) Patent No.: US 8,451,038 B2
(45) Date of Patent: May 28, 2013

(54) DIGITAL CONTROL UNIT HAVING A TRANSIENT DETECTOR FOR CONTROLLING A SWITCHED MODE POWER SUPPLY

(75) Inventors: Magnus Karlsson, Oskarshamn (SE); Henrik Borgengren, Kalmar (SE); Anders Kullman, Kalmar (SE); Jonas Malmberg, Farjestaden (SE); Fredrik Wahledow, Farjestaden (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/388,578

(22) PCT Filed: Feb. 2, 2011

(86) PCT No.: PCT/EP2011/051476
§ 371 (c)(1),
(2), (4) Date: Feb. 2, 2012

(87) PCT Pub. No.: WO2012/103941
PCT Pub. Date: Aug. 9, 2012

(65) Prior Publication Data
US 2012/0200331 A1   Aug. 9, 2012

(51) Int. Cl.
*G05F 1/00* (2006.01)
(52) U.S. Cl.
USPC .......................................... 327/175; 323/284

(58) Field of Classification Search
USPC .. 327/72, 73, 172–176; 323/282, 284; 363/50
See application file for complete search history.

(56) References Cited

U.S. PATENT DOCUMENTS

| 7,239,257 | B1 * | 7/2007 | Alexander et al. | 341/138 |
| 2012/0049908 | A1 * | 3/2012 | Karlsson et al. | 327/154 |
| 2012/0153919 | A1 * | 6/2012 | Garbossa et al. | 323/284 |

* cited by examiner

*Primary Examiner* — Patrick O'Neill
(74) *Attorney, Agent, or Firm* — Roger S. Burleigh

(57) ABSTRACT

A switched mode power supply (SMPS) comprising a feedback unit, voltage feed forward (VFF) compensation signal generator and a transient detector. A VFF compensation signal is only applied to the output of the feedback unit when a transient is detected by the transient detector on the input voltage of the SMPS, thereby saving power and computation time. The transient detector comprises a first comparator to detect that a positive transient has occurred if a difference signal is greater than a positive threshold level; a second comparator to determine if the difference signal is within a predetermined range of positive values and output a result that indicates if the difference signal is within the predetermined range of positive values; and a first calculator to detect that a positive transient has occurred if, out of a first predetermined number of consecutive results of the output of the second comparator, there is at least a second predetermined number of results indicating that the difference signal is within the predetermined range of positive values. The transient detector comprises further features for similarly detecting a negative transient.

14 Claims, 14 Drawing Sheets

| VFF scheme | Max overshoot [V] | Max undershoot [V] |
|---|---|---|
| Without VFF | 3.952 | -2.373 |
| VFF in cascade (Fig. 1) | 0.228 | -0.131 |
| VFF inside integrator (Fig. 7) | 0.480 | -0.192 |
| VFF division less (Fig. 9) | 0.480 | -0.131 |
| VFF multiplier less (Fig. 11) | 0.521 | -0.253 |

DIGITAL CONTROL UNIT HAVING A TRANSIENT DETECTOR FOR CONTROLLING A SWITCHED MODE POWER SUPPLY

TECHNICAL FIELD

The present invention relates generally to the field of switched mode power supplies (sometimes referred to as switch mode power supplies or switching mode power supplies) and more specifically to a digital control unit for a switched mode power supply, the digital control unit having a transient detector for detecting a transient on an input signal to the switched mode power supply.

BACKGROUND

The switched mode power supply (SMPS) is a well-known type of power converter having a diverse range of applications by virtue of its small size and weight and high efficiency. For example, SMPSs are widely used in personal computers and portable electronic devices such as cell phones. An SMPS achieves these advantages by switching a switching element such as a power MOSFET at a high frequency (usually tens to hundreds of kHz), with the frequency or duty cycle of the switching being adjusted using a feedback signal to convert an input voltage to a desired output voltage.

An SMPS may take the form of a rectifier (AC/DC converter), a DC/DC converter, a frequency changer (AC/AC) or an inverter (DC/AC).

In most SMPS topologies, the voltage of the output signal, $V_{out}$, is directly proportional to the voltage of the input signal, $V_{in}$:

$$V_{out} \propto DV_{in} \qquad \text{Equation 1}$$

In Equation 1 above, D is the duty cycle of the switching.

To minimise the difference between the actual output voltage and the desired output voltage, the duty cycle is usually controlled in dependence upon a feedback signal, wherein the feedback signal is an error signal between a measured output voltage and a desired output voltage. The error signal is fed back to a feedback unit that controls the duty cycle so that the measured output voltage is adjusted to the desired output voltage.

It is preferable for the output signal of the SMPS to remain at its desired voltage level under all conditions. However, it is difficult to maintain the desired output voltage level due to transients on the input signal.

A transient is a change in the input signal to the SMPS. Transients on the input signal can cause the output voltage level to change almost immediately.

In known SMPS designs, only the inertia in an output filter of the SMPS will decrease this effect. In addition the error signal fed back to the feedback unit is often too slow in changing the duty cycle and so a large transient is introduced on the output voltage.

A known solution to the problems caused by input transients is to cascade a voltage feedforward (VFF) compensator 102 with a feedback unit 101 as shown in FIG. 1.

In the cascade, or series, arrangement shown in FIG. 1, the feedback unit 101 calculates a duty cycle for an SMPS (not shown in FIG. 1). The VFF compensator 102, which is separate from the feedback unit, calculates and applies VFF compensation to adjust the duty cycle that has already been calculated by the feedback unit 101.

Known feedforward systems based on the arrangement of FIG. 1 are disclosed in:

Calderone, L. Pinola, V. Varoli, "Optimal feed-forward compensation for PWM DC/DC converters with "linear" and "quadratic" conversion ratio, *IEEE trans, Power Electron.*, vol. 7, No. 2, pp 349-355, April 1992.

B. Arbetter and D. Marksimovic, "Feedforward Pulse Width Modulators for Switching Power Converters," *IEEE trans, Power Electron.*, vol. 12, no. 2, pp 361-368, March 1997.

M. K. Kazimierczuk, A. J. Edstron, "Open-loop peak voltage feedforward control of PWM Buck converter" *IEEE trans. Circuits and Systems* I, vol. 47, No. 5, pp. 740-746, May 2000.

J.-P. Sjoroos, T. Suntio, J. Kyyra, K. Kostov, "Dynamic performance of buck converter with input voltage feedforward control," *European Conference on Power Electronics and Applications*, 2005.

An SMPS controlled by a digital control unit is shown in FIG. 2.

The voltages of the input and output signals of the SMPS 201 are sampled and converted to digital samples by analogue-to-digital converters (ADCs) 202 and 203.

Logic units 204 and 205 are used for transforming the samples into a form suitable for processing by the digital control unit and for noise filtering.

The output voltage samples from logic unit 205 are fed to the feedback unit 206, which applies a control law as explained below.

A typical control law for controlling the duty cycle of an SMPS is a proportional-integral-difference (PID), also referred to as proportional-integral-differential or proportional-integral-derivative, control law. Implementations of a feedback unit that apply a PID control law are shown in FIGS. 3A and 3D.

In both FIGS. 3A and 3B, X(n) is an error signal, representing the difference between a desired and an actual signal, wherein the signals are typically sampled values of a measured voltage. Y(n) is a correction signal calculated in dependence upon the error signal.

As can be seen from in FIG. 3A, X(n) is split into three signals.

The first signal is split and one part of the split signal is delayed by delay element 301. The delayed part of the signal is subtracted from the non-delayed part to generate a difference signal that is input to amplifier 305.

The second signal is a proportional signal and is input to amplifier 306.

The third signal is input to adder 302. The output from adder 302 is split and one part of the split signal is delayed by delay element 304. The delayed part of the signal is input to adder 302. The non-delayed part is an integral signal and is input to amplifier 307.

Proportional, integral and difference signals are therefore generated.

Generally speaking, the proportional signal determines the reaction to the current error signal, the integral signal determines the reaction based on the sum of recent error signal values (i.e. recent samples of the error signal) and the difference signal determines the reaction based on the rate at which the error signal is changing.

The proportional, integral and difference signals fed into amplifiers, or multipliers, 305, 306 and 307, are weighted by their respective gains of $K_D$, $K_P$ and $K_I$. The outputs of amplifiers 305, 306 and 307 are input to adder 308. The output of adder 308, which comprises a summation of the input signals to adder 308, is the control signal generated according to the PID control law.

The gains $K_P$, $K_I$ and $K_D$ determine the response of the feedback unit and are set according to system requirements (such as response time to an error or extent of overshoot, for example).

A PID circuit with simplified hardware is shown in FIG. 3B.

In the PID implementation in FIG. 3B, the input signal X(n) is split and one part of it is input to amplifier, or multiplier, 311. The other part of is input to delay element 309.

The output of delay element 309 is split and one part of it is input to amplifier, or multiplier, 312. The other part of the output of delay element 309 is input to delay element 310. The output of delay element 310 is input to amplifier, or multiplier, 313.

The outputs of amplifiers, or multipliers, 311, 312 and 313 are input to the adder 314. The output of the adder 314 is split and one part of the split signal is output as the control signal. The other part of the slit signal is fed to delay element 315. The output of delay element 315 is input to the adder 314.

For the circuit design in FIG. 3B to correspond to that in FIG. 3A, the gains KA, KB and KC are calculated as:

$$KA = K_I + K_P + K_D \qquad \text{Equation 2}$$

$$KB = (K_P + 2K_D) \qquad \text{Equation 3}$$

$$KC = K_D \qquad \text{Equation 4}$$

In the circuit of FIG. 3B, there is a feedback loop between the output of the adder 314 and an input to the adder. The feedback signal input to the adder typically is referred to as the integral signal and it is input to the integral input of the adder. A feedback unit with such an input to the adder is said to comprise an integrator.

The above PID control law is described, for example, in M. A. Alexander, D. E. Heineman, K. W. Fernald, S. K. Herrington, "Hardware efficient digital control loop architecture for a power converter," U.S. Pat. No. 7,239,257 B1 (Jul. 3, 2007).

In the feedback unit of FIG. 3B, the inputs to the adder 314 are weighted by constant factors (i.e. KA, KB and KC are constant; and the output of delay element 315 is weighted by the constant one). The circuit implementation is therefore an example of a direct form 1 implementation of a digital filter of order 2. Direct form 2 and transposed direct designs of feedback unit are also possible.

It will therefore be appreciated that the above-described PID control law is just one example of a suitable control law for determining the duty cycle of a SMPS. Many alternative control laws are also possible, such as PI, PD, P, I and FIR for example.

Referring again to FIG. 2, the output from the feedback unit 206 is adjusted by the VFF compensator 207, in dependence upon the input voltage samples from the logic unit 204, to produce a compensated duty cycle control signal.

The VFF compensation reduces the effects that transients on the input signal have on the output signal of the SMPS 201.

The compensated duty cycle control signal D is output from the digital control unit and is fed to a digital pulse width modulator 208. The digital pulse width modulator 208 translates the duty cycle control signal from a digital format to a pulse width modulated (PWM) duty cycle signal. The PWM signal is then output to control the switching elements of the SMPS 201.

The conditions for voltage feed forward compensation are explained below.

In a buck converter, the ideal duty cycle, D, is equal to:

$$D = \frac{V_{out}}{V_{in}} \qquad \text{Equation 5}$$

When the input voltage changes, from $V_{in-old}$ to $V_{in-new}$, the old duty cycle, $D_{old}$, should be scaled to a new duty cycle, $D_{new}$, so the output voltage remains constant.

$$V_{out} = D_{out} V_{in-old} \qquad \text{Equation 6}$$
$$= D_{new} V_{in-new}$$

Solving Equation 6 for the new duty cycle $D_{new}$ yields, $$D_{new} = \frac{V_{in-old}}{V_{in-new}} \cdot D_{old} \qquad \text{Equation 7}$$

The computations for the compensation condition described in Equation 7 consist of a division followed by a multiplication. Since the division is a more complex operation than a multiplication, in many cases it is preferable to perform the division by a look-up-table operation followed by an additional multiplication, as shown in Equation 8.

$$D_{new} = \frac{1}{V_{in-new}} \cdot V_{in-old} \cdot D_{old} \qquad \text{Equation 8}$$

U.S. Pat. No. 7,239,257 B1 discloses the use of a look-up-table for performing such a division.

In addition, U.S. Pat. No. 7,239,257 B1 discloses that when using a feedback unit with an integrator, such as the earlier described feedback unit in FIG. 3B, one of the multiplications can be avoided by using a nominal value of $V_{in-old} = V_{in-min}$, where $V_{in-min}$ is the minimum measured input voltage. The look up table is then scaled with $V_{in-min}$.

The calculation of a compensated duty cycle therefore becomes:

$$D_{new} = \frac{V_{in-min}}{V_{in-new}} \cdot D_{old} \qquad \text{Equation 9}$$

Another way of addressing the problem of the computational requirements caused by the divisions is to make the delay in the digital pulse width modulator proportional to the reciprocal of the input voltage. This mixed signal solution is disclosed in X. Zhang and D. Maksimovic, "Digital PWM/PFM Controller with Input Voltage Feed-Forward for Synchronous Buck Converters", in Proc. IEEE Appl. Power Electron. Conf. Expo., February 2008, pp 523-528.

A problem experienced by the above described SMPS controllers, that use a feedback unit and a VFF compensator, is that the calculation of the compensation signal and the calculation of a duty cycle control signal by the feedback unit results in long computation times and increased power consumption.

Moreover, the complex and time consuming division operation with an additional multiplication has to be performed every switch period even when the input voltage is stable.

Due to the above-identified computational requirements, known systems use a digital signal processor (DSP) to calculate a compensated duty cycle. However, DSPs are expensive, have a high power-consumption and long computation times. DSPs are also large and not suitable for use in compact applications.

An additional problem with known digital VFF compensation signal generators is that when the voltage of the input signal is located near a quantization level of the ADC for measuring the input signal, noise can cause the quantized version of the input signal to change. The VFF compensation will then introduce transients on the output signal even when the input signal is nearly constant.

A further problem is experienced when the input signal is changing slowly and feedback is compensating for the changes. When the voltage of the input signal then changes from one quantization level to the next, the VFF compensation will add additional compensation which introduces transients on the output signal.

Yet a further problem with known SMPS controllers is that at light load, energy can be transferred back and forth in isolated. DC/DC converters and this makes the input voltage rise. This also triggers the VFF compensation and introduces output voltage noise.

SUMMARY OF INVENTION

According to a first aspect of the invention, there is provided a digital control unit for controlling a duty cycle of a switched mode power supply.

The digital control unit comprises: a feedback unit operable to calculate a digital control signal for controlling a duty cycle of the switched mode power supply, a voltage feed forward compensation signal generator operable to calculate a compensation signal for adjusting the digital control signal in dependence upon an input signal of the switched mode power supply, and a transient detector operable detect a transient on an input signal of a switched mode power supply.

The digital control unit is responsive to the detection of a transient by the transient detector to adjust the digital control signal for controlling the duty cycle of the switched mode power supply in accordance with the compensation signal.

The transient detector comprises an input arranged to receive a difference signal that represents the difference between consecutive values of the input signal to the switched mode power supply. A first comparator is operable to detect that a positive transient on the input signal has occurred if the difference signal is greater than a positive threshold level. A second comparator is operable to determine if the difference signal is within a predetermined range of positive values and output a result that indicates if the difference signal is within the predetermined range of positive values. A first calculator is operable to detect that a positive transient on the input signal has occurred if, out of a first predetermined number of consecutive results of the output of the second comparator, there is at least a second predetermined number of results indicating that the difference signal is within the predetermined range of positive values. A third comparator is operable to detect that a negative transient on the input signal has occurred if the difference signal is less than a negative threshold level. A fourth comparator is operable to determine if the difference signal is within a predetermined range of negative values and output a result that indicates if the difference signal is within the predetermined range of negative values. A second calculator is operable to detect that a negative transient on the input signal has occurred if, out of a third predetermined number of consecutive results of the output of the fourth comparator, there is at least a fourth predetermined number of results indicating that the difference signal is within the predetermined range of negative values.

In accordance with these features, a transient detector detects transients on the input signal and the VFF compensation is only applied when a transient has been detected by the transient detector.

Advantageously, since the VFF compensation is not applied, or necessarily calculated, when a transient has not been detected on the input signal, a saving in power and computation time results.

The features of the transient detector enable transients to be detected reliably and provide a transient detector which is especially good at dealing with measurement noise and light load induced noise.

According to a second aspect of the invention, there is provided a method of controlling a duty cycle of a switched mode power supply. The method comprises calculating a digital control signal for controlling a duty cycle of the switched mode power supply; calculating a compensation signal for adjusting the digital control signal in dependence upon an input signal of the switched mode power supply; detecting a transient on the input signal of the switched mode power supply; and adjusting, in dependence upon the detection of a transient, the digital control signal for controlling the duty cycle of the switched mode power supply in accordance with the compensation signal.

The process of detecting a transient comprises processing a difference signal that represents a difference between consecutive values of the input signal to the switched mode power supply by: performing a first positive transient detection process comprising detecting that a positive transient on the input signal has occurred if the difference signal is greater than a positive threshold level; performing a second positive transient detection process comprising determining if the difference signal is within a predetermined range of positive values, outputting a result that indicates if the difference signal is within the predetermined range of positive values, and detecting that a positive transient on the input signal has occurred if, out of a first predetermined number of consecutive said results, there is at least a second predetermined number of results indicating that the difference signal is within the predetermined range of positive values; performing a first negative transient detection process comprising detecting that a negative transient on the input signal has occurred if the difference signal is less than a negative threshold level; performing a first positive transient detection process comprising determining if the difference signal is within a predetermined range of negative values, outputting a result that indicates if the difference signal is within the predetermined range of negative values, and detecting that a negative transient on the input signal has occurred if, out of a third predetermined number of consecutive said results there is at least a fourth predetermined number of results indicating that the difference signal is within the predetermined range of negative values.

The method for controlling a duty cycle of a switched mode power supply according to the second aspect of the invention provides the same advantages as described above for the digital control unit according to the first aspect of the invention.

LIST OF FIGURES

FIG. 13 shows experimental results comparing the performance of embodiments of the invention with known digital control units.

DETAILED DESCRIPTION OF EMBODIMENTS

Figure 1:
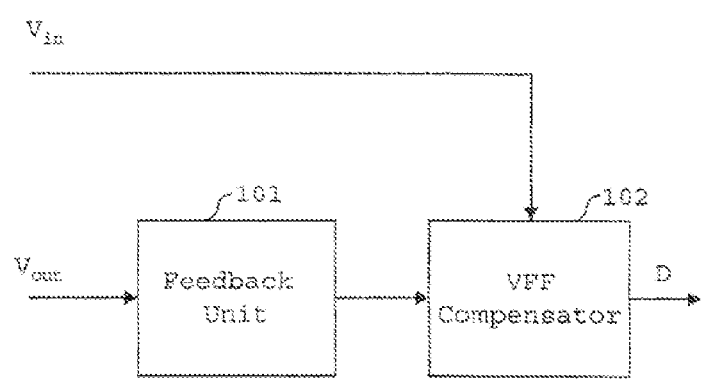
FIG. 1 is a block diagram of a known design of a digital control unit comprising a feedback unit in cascade with a VFF compensator.

Before describing embodiments of the invention, a transient detector 701, and method of transient detection, that will be used in the embodiments will be described with reference to FIGS. 4 and 5.

The transient detector 701 is for detecting transients on the input signal to an SMPS.

The input signal to the transient detector 701 is a value representing the difference between the voltages of two consecutive input signals to the SMPS.

The input signal of the transient detector 701 is input into parallel arrangement of four comparators.

As described in detail below, a first comparator 402 and second comparator 403 are operable to detect if a positive transient on the input signal to the SMPS has occurred, whereas a third comparator 406 and fourth comparator 407 are operable to detect if a negative transient on the input signal to the SMPS has occurred.

The first comparator 402 compares the input signal to the transient detector 701 with a positive threshold value and, if the input signal is greater than the positive threshold value, the first comparator 402 detects that a positive transient has occurred on the input signal and outputs a signal representing this result.

If the input signal is less than the positive threshold value, the first comparator 402 outputs a signal indicating that a transient has not occurred on the input signal.

The second comparator 403 detects if the value of the input signal lies within a predetermined range of positive values.

For example, the lower value of the range of positive values may be set as the size of a quantization step of the ADC used to measure the input signal to the SMPS, and the upper limit of the range would then be a greater value than said quantization step size of the ADC.

For each signal input to it, the second comparator 403 outputs a result indicating whether the value of the input signal lies within the predetermined range of the second comparator 403.

Figure 4:
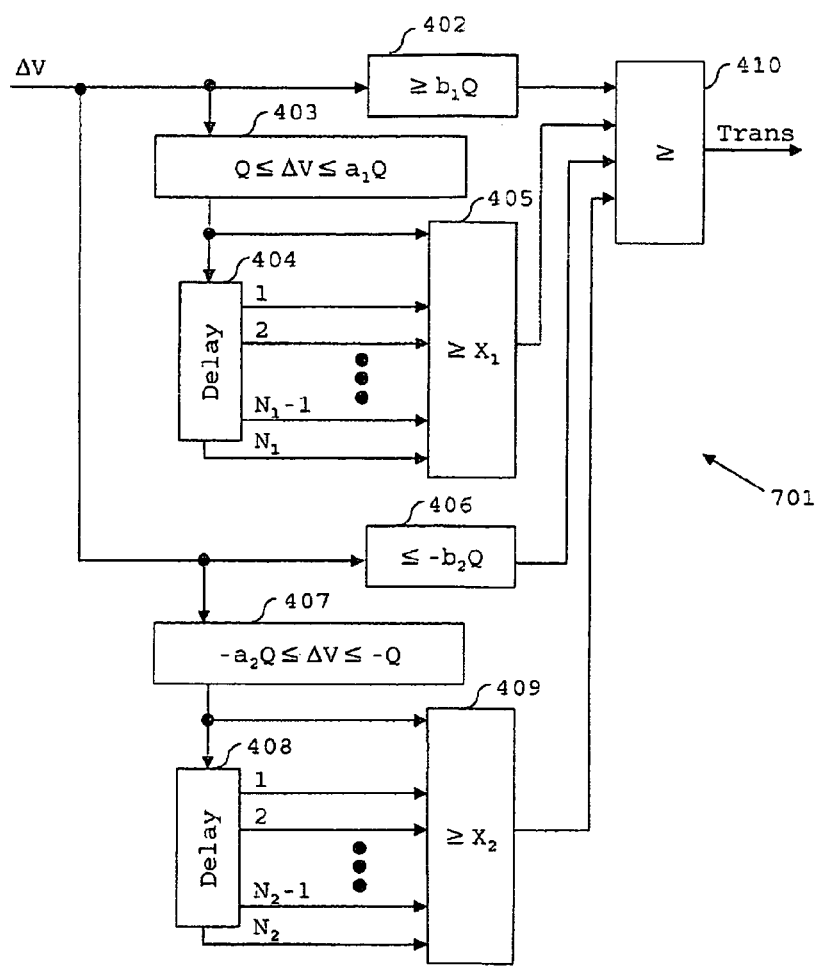
FIG. 4 is a diagram of a transient detector for use in embodiments of the invention.

As shown in FIG. 4, consecutive values output from the second comparator 403 are input into a first tapped delay line 404. The first tapped delay line 404 stores $N_1$ consecutive output signals from the second comparator 403. Each of these $N_1$ signals forms a parallel input into a first calculator 405.

The first calculator 405 determines if at least $X_1$ of the signals input to it from the first tapped delay line 404 represent values of input signals to the transient detector 701 that lie within the predetermined range of the second comparator 403.

If at least $X_1$ out of the $N_1$ samples represent values of input signals to the transient detector 701 that lie within the predetermined range of the second comparator 403, the first calculator 405 outputs a signal indicating that a positive transient has a occurred.

Accordingly, a positive transient on the input voltage is detected if the input signal to the transient detector 701 is greater than a positive threshold value or if at least $X_1$ out of $N_1$ consecutive values of the input signal lie within a predetermined range of positive values.

The third comparator 405 compares the input signal to the transient detector 701 with a negative threshold value and, if the input signal is less than the negative threshold value, the third comparator 406 detects that a negative transient has occurred on the input signal and outputs a signal representing this result.

If the input signal is greater than the negative threshold value, the third comparator 406 outputs a signal indicating that a transient has not occurred on the input signal.

The fourth comparator 407 detects if the value of the input signal lies within a predetermined range of negative values. For example, the least negative value of the range of negative values may be set to have the same magnitude as the size of a quantization step of the ADC used to measure the input signal to the SMPS, and the most negative value of the range would then be set to have a greater magnitude than said quantization step size of the ADC.

For each signal input to it, the fourth comparator 407 outputs a result indicating whether the value of input signal lies within the predetermined range of the fourth comparator 407.

As shown in FIG. 4, consecutive values output from the fourth comparator 407 are input into a second tapped delay line 408. The second tapped delay line 408 stores $N_2$ consecutive output signals from the fourth comparator 407. Each of these $N_2$ signals forms a parallel input into a second calculator 409.

The second calculator 409 determines if at least $X_2$ of the signals input to it from the second tapped delay line 408 represent values of input signals to the transient detector 701 that lie within the predetermined range of the fourth comparator 407.

If at least $X_2$ out of the $N_2$ samples represent values of input signals to the transient detector 701 that lie within the predetermined range of the fourth comparator 407, the second calculator 409 outputs a signal indicating that a negative transient has occurred.

Accordingly, a negative transient on the input voltage is detected if the input signal to the transient detector 701 is less than a negative threshold value or if at least $X_2$ out of $N_2$ consecutive values of the input signal lie within a predetermined range of negative values.

Accordingly, either of the first comparator 402 or first calculator 405 detect when a positive transient occurs, and either of the third comparator 406 or the second calculator 409 detect when a negative transient occurs.

The outputs of the first comparator 402, first calculator 405, third comparator 406, and second calculator 409 are all input into a third calculator 410.

The third calculator 410 outputs a result indicating that a transient has occurred on the input signal of the SMPS if any of the input signals to the third calculator 410 indicate that a transient has occurred.

The third calculator 410 outputs a signal indicating that a transient has not occurred on the input signal of the SMPS only if all of the input signals to the third calculator 410 indicate that a transient has not occurred.

The transient detector 701 described above would typically be configured such that $N_1$ is the same as $N_2$ and $X_1$ is the same as $X_2$.

Examples vales are: $N_1=N_2=8$; and $X_1=X_2=6$.

The minimum positive and negative slewrates of a transient on the input signal that can be compensated using the transient detector 701 is defined as:

$$PosSlew_{min} = \frac{X_1 Q}{(N_1 + 2)T_s}; \quad \text{Equation 10}$$

$$NegSlew_{min} = \frac{X_2 Q}{(N_2 + 2)T_s}; \quad \text{Equation 11}$$

In Equations 10 and 11 above, $PosSle_{min}$ is the minimum positive slewrate, $NegSlew_{min}$ is the minimum negative slewrate, and $T_s$ is the sampling period.

Hence the minimum slewrate for VFF compensation can be designed by an appropriate selection of the quantization step in the ADC, the sampling period of the input signal measurement and the coefficients $X_1$, $X_7$, $N_1$ and $N_2$.

The threshold levels of the first 402 and third 406 comparator, and the predetermined ranges of the second and third comparators are set in dependence upon the noise levels.

Input voltage transients with a slewrate lower that the minimum slewrates defined in Equations 10 and 11 are compensated for by the feedback unit.

By incorporating the above described transient detector 701 into a digital control for an SMPS and applying the VFF compensation in dependence upon the detection of a transient, the previously described problems are addressed. For example, the problem experienced when the voltage of the input signal changes from one quantization level to the next is addressed since a change in quantization level does not necessarily result in the VFF being applied.

In an isolated SMPS, it is possible for the current in the conductor to change sign and for energy to be transferred backwards from the output to the input.

Such a problem is experienced by, for example, synchronous rectifiers during light load conditions and it causes the input voltage to rise.

However, the above described transient detector 701 addresses this problem by not detecting such a change in input voltage as an input voltage transient. Output voltage noise caused by the VFF compensation being triggered during light load conditions is therefore avoided.

The above advantage is realised by determining if $X_1$ samples of $N_1$ consecutive samples, or $X_2$ of $N_2$ consecutive samples, lie within a predetermined range. Accordingly, it is possible to correctly detect transients, and avoid incorrectly detecting transients, even when there has been a reversal of sign of the input voltage to the SMPS.

It will be appreciated that many changes can be made to the above-described transient detector 701 whilst retaining its advantages.

For example, the first 402 and third 406 comparators may alternatively operate by also detecting that a transient has occurred when the value of the input signal is equal the respective threshold values of each comparator.

The second 403 and fourth 407 comparators may also detect that the value of the input signal lies within the respective predetermined range of each of the comparators if the value of the input signal is the same as one of the upper or lower limits of each predetermined range.

The upper limit of the predetermined range of the second comparator 403 may be set to be the same as the threshold value of the first comparator 402.

Similarly, the most negative value of the predetermined range of the fourth comparator 407 may be the same as the threshold value of the third comparator 406.

A method of transient detection, comprising processes performed within the above described transient detector, will now be described below with reference to FIG. 5.

Figure 5:
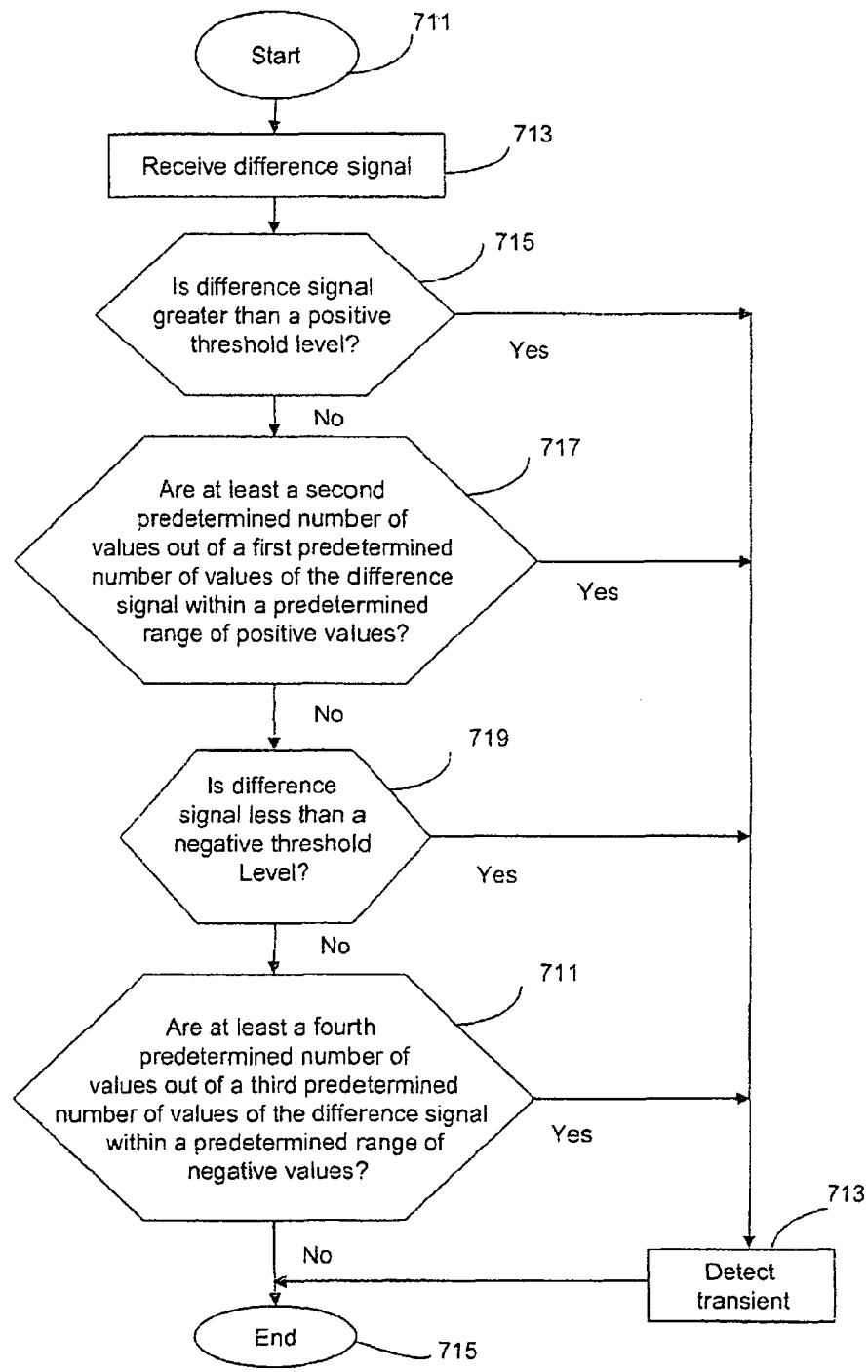
FIG. 5 is a flow chart showing the processes performed by the transient detector of FIG. 4.

Referring to FIG. 5, in step 711, the process of transient detection starts.

In step 713, a difference signal, that represents the difference between consecutive values of the input signal to the switched mode power supply is input into the transient detector 701.

In step 715, the first comparator 402 determines if the difference signal is greater than a positive threshold value.

If in step 715 it is determined that the difference signal is greater than the positive threshold level, then the process proceeds to step 713 where the first comparator 402 detects a transient.

If in step 715 it is determined that the difference signal is not greater than the positive threshold level, the process then proceeds to step 717.

In step 717, the second comparator 403 and first calculator 405 determines if a first predetermined number of values of the difference signal contain at least a second predetermined number of values that are within a predetermined range of positive values.

If in step 717 it is determined that a first predetermined number of values of the difference signal contain at least a second predetermined number of values that are within the predetermined range of positive values, the process then proceeds to step 717 where the first calculator 405 detects transient.

If in step 717 it is determined that a second predetermined number of values of the difference signal do not contain at least a second predetermined number of values that within the predetermined range of positive values, the process then proceeds to step 719.

In step 719, the third comparator 406 determines if the difference signal is less than a negative threshold value.

If in step 719 it is determined that the difference signal is less than the negative threshold level, the process then proceeds to step 713 where the third comparator 406 detects a transient.

If in step 719 it is determined that the difference signal is not less than the negative threshold level, the process then proceeds to step 711.

In step 711, the fourth comparator 407 and second calculator 409 determine if a third predetermined number of values of the difference signal contain at least at least a fourth predetermined number of values that are within a predetermined range of negative values.

If in step 711 it is determined that a third predetermined number of values of the difference signal contain at least at least a fourth predetermined number of values that are within a predetermined range of negative values, the process then proceeds to step 713 where a the second calculator detects a transient.

If in step 711 it is determined that a third predetermined number of values of the difference signal do not contain at least at least a fourth predetermined number of values that are within a predetermined range of negative values, the process then proceeds to step 715 where it ends.

In summary, therefore, if in any of steps 715, 717, 719 and 711 the process has proceeded to step 713, then a transient is detected.

First Embodiment

According to a first embodiment, the above described transient detector 701 is incorporated into a digital control unit for an SMPS.

Figure 6:
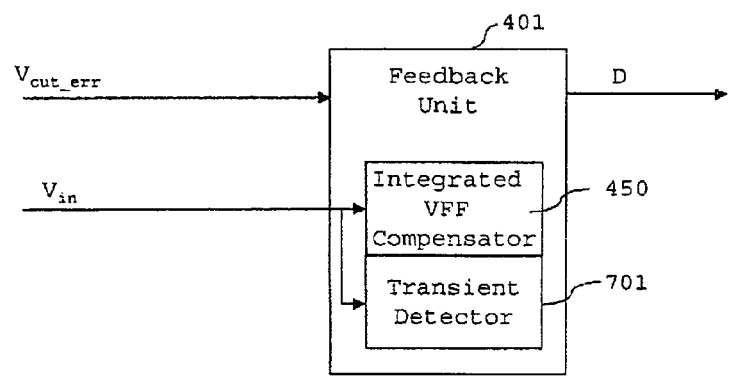
FIG. 6 is a block diagram showing a digital control unit having a transient detector according to a first embodiment.

FIG. 6 is a block diagram of the digital control unit 401 of the first embodiment, in which a VFF compensator 450 and transient detector 701 are integrated into a feedback unit.

Advantageously, the integration of the VFF compensator into the digital control unit allows a more compact realisation of the digital control unit.

In addition, the algorithms used in the VFF compensation can result in reduced computational requirements.

Figure 7:
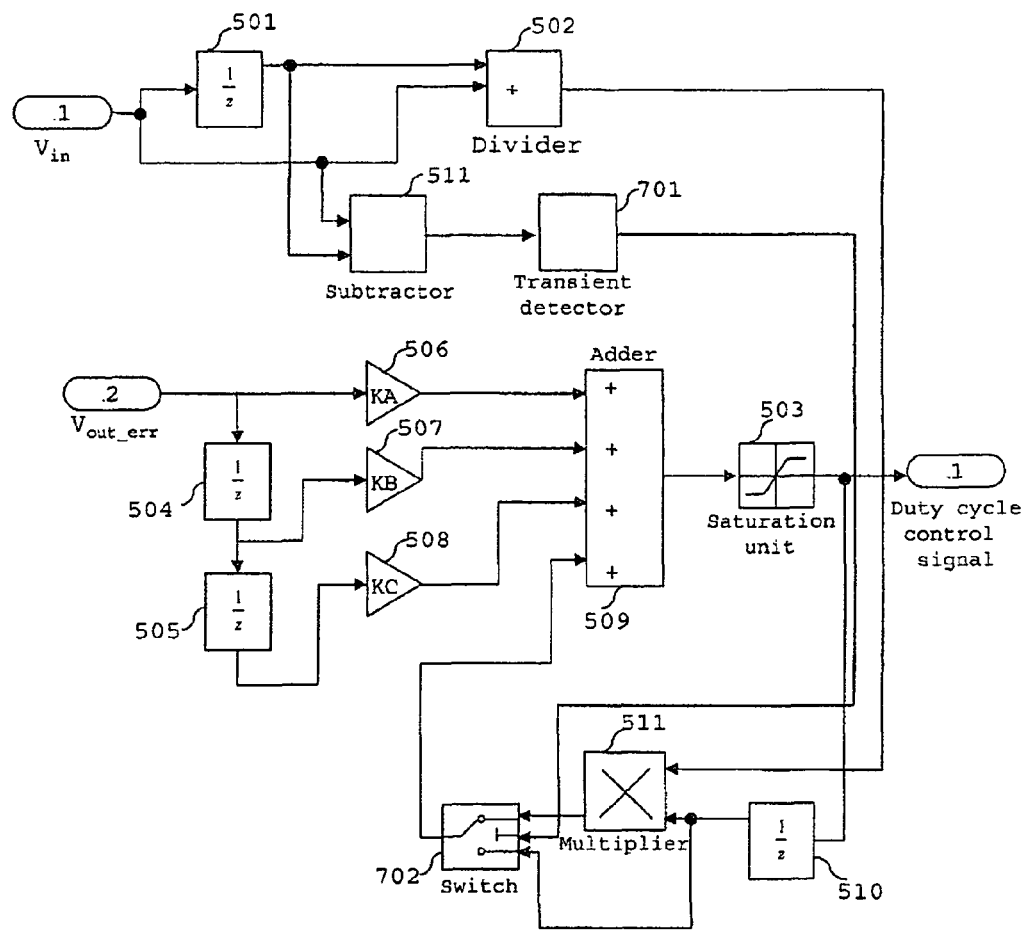
FIG. 7 is a circuit diagram of a digital control unit having a transient detector according to the first embodiment of the invention.

A more detailed circuit diagram of the digital control unit 401 according to the first embodiment is shown in FIG. 7.

Referring to FIG. 7, input port 2 receives an error signal, $V_{out\_err}$, which represents the difference between the measured output voltage and the desired output voltage of the SMPS.

The input signal $V_{out\_err}$ is fed into an arrangement of delay elements 504 and 505 as well as amplifiers, or multipliers, 506, 507 and 508 with respective gains KA, KB and KC. The outputs of the amplifiers are fed into three inputs of an adder 509.

The output of the adder 509 is fed to a hard limiter 503, otherwise referred to as a saturation unit, that limits the output from the digital control unit to within upper and lower limits such that it is within a practical range for the system.

The output from the hard limiter 503 comprises the digital control signal for controlling the duty cycle of the SMPS (not shown in FIG. 7). The output of the hard limiter is fed to a splitter to split the output of the hard limiter into two signals.

Figure 2:
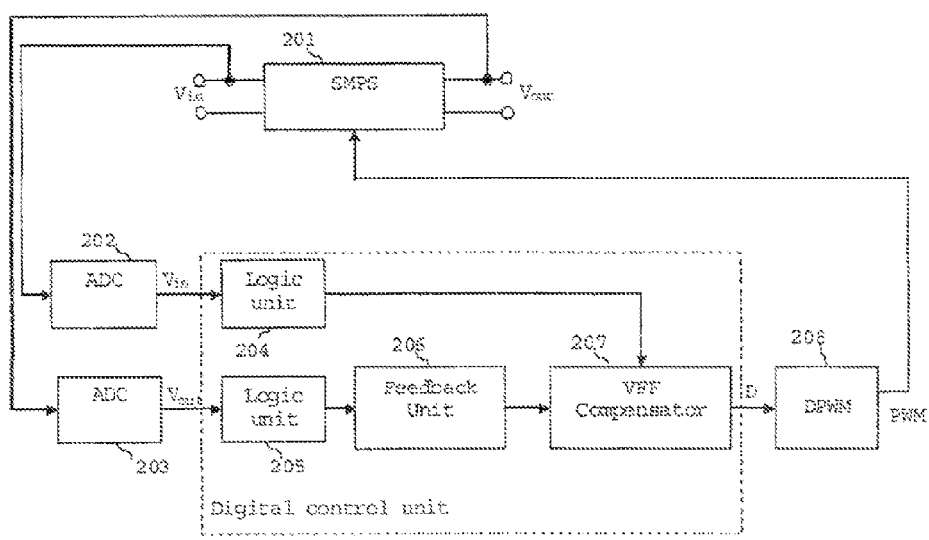
FIG. 2 is a schematic diagram showing a known design of a digital control unit arranged to control a digital pulse width modulator that generates the duty cycle signal of an SMPS.

A first signal from the splitter is output from the digital control unit. This digital control signal output is typically used to control a digital pulse width modulator, such as the digital pulse width modulator 208 shown in FIG. 2, that generates a PWM signal for controlling the duty cycle of the SMPS.

The second signal from the splitter is fed through a delay element 510 and into an input of multiplier 511. The output of multiplier 511 is input to adder 509 via switch 702.

There is therefore a feedback circuit between the output and an input of the adder 509. The signal input to the adder from the feedback circuit is a feedback signal and may be referred to as an integral signal, at the integral input of the adder.

The feedback of the output of the digital control unit by the feedback circuit has the effect of introducing memory into the system. The output of the digital control unit is therefore dependent upon the current measured output voltage, the current measured input voltage and previous outputs of the digital control unit.

Figure 3A:
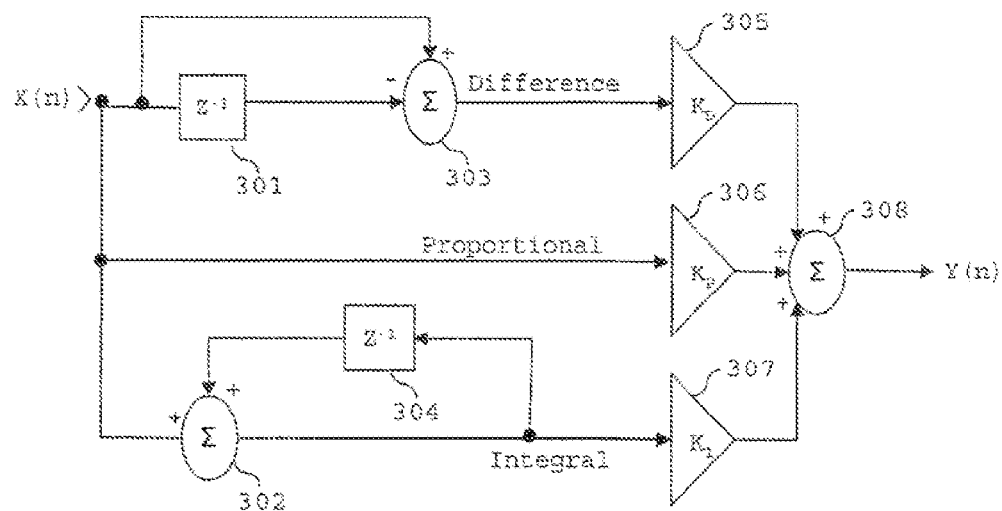
FIG. 3A is a schematic diagram showing a known implementation of a PID controller.
Figure 3B:
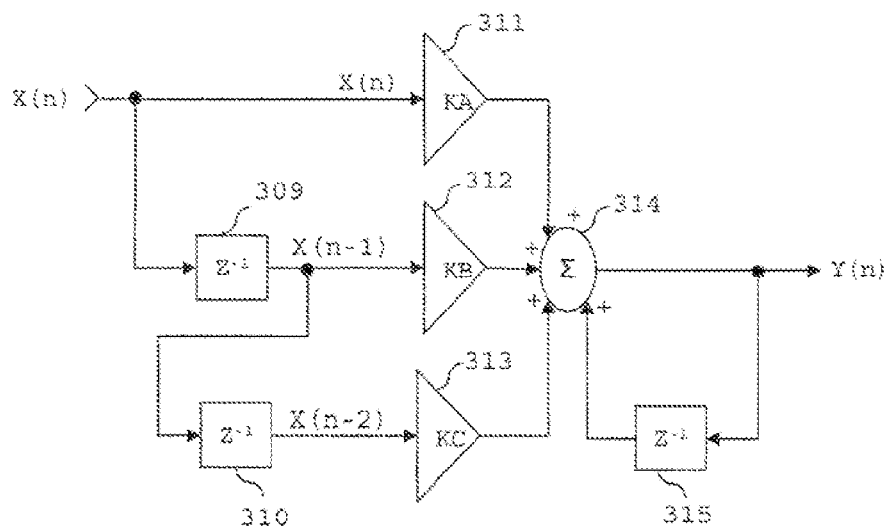
FIG. 3B is a known alternative to the implementation of the PID controller in FIG. 3A that has a simplified circuit design.

In the circuit arrangement described above, delay elements 504, 505 and 510, the amplifiers 506, 507 and 508, and the adder 509 calculate a digital control signal for the SMPS from an error signal, wherein the error signal is calculated from the measured output voltage. This configuration is a known PID implementation of a feedback unit, as described earlier with reference to FIG. 3B, and the gains KA, KB and KO can be determined in accordance with known PID control schemes. It should be noted that other configurations of feedback unit are possible in an embodiment instead of a PID configuration. For example, a feedback unit that implements PI, PD, P, I, FIR or other control techniques could alternatively have been applied.

Input 1 of the digital control unit in FIG. 7 receives a signal representing the input voltage of the SMPS. The input signal is split and one part is delayed by a delay element 501 and the delayed and non-delayed parts of the input signal are input into a computation unit 502.

In this embodiment computation unit 502 comprises a divider, which divides the delayed part of the input signal by the non-delayed part of the input signal. In some applications, it may be desirable for computation unit 502 to reference a look-up-table to generate the result of the division operation. The output of computation block 502 is a VFF compensation signal that is dependent upon the input voltage of the SMPS.

The VFF compensation signal is input to a combination unit 511. In this embodiment, computation unit 511 comprises a multiplier, which multiplies the VFF compensation signal with the output of delay element 510.

The output of computation unit 511 is a product of the output of delay element 510 (namely, a delayed version of the digital control signal) and the VFF compensation signal output from the computation unit 502.

In this way, VFF compensation is performed on a signal input to adder 509 from the feedback circuit.

By introducing the VFF compensation signal into the feedback circuit of the feedback unit, the digital control unit in FIG. 7 has a VFF compensator integrated into a feedback unit.

The result of applying the VFF compensation signal to a signal within the feedback circuit between an output and an input of adder 509 is that an approximation of the VFF compensation of Equation 7 is provided. Advantageously, however, a compact digital control unit with low computation times is realised.

Figure 10:
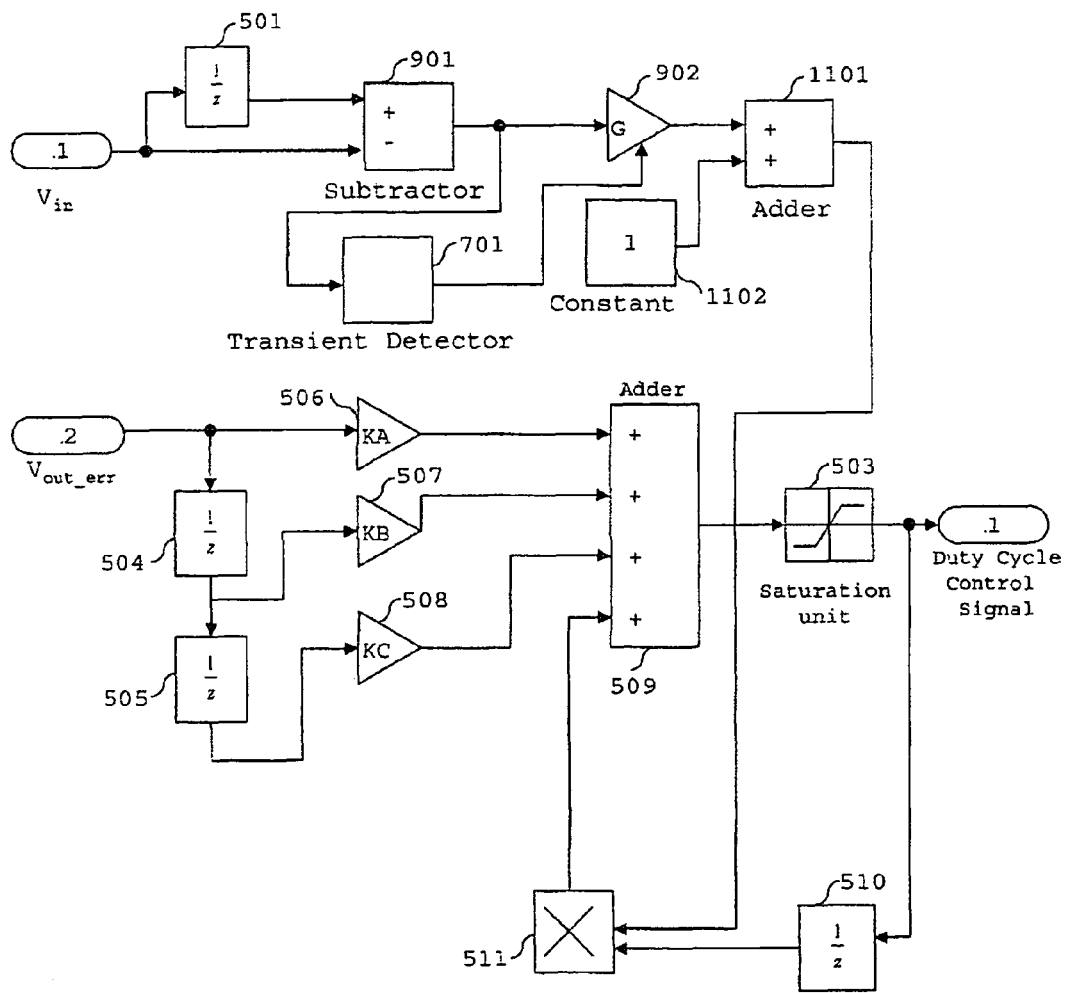
FIG. 10 is a diagram of a digital control unit according to a third embodiment of the invention.

The digital control unit further comprises subtractor 511 and the transient detector 701 according to the first embodiment, labelled 701 in FIG. 10.

Subtractor 511 receives the current input signal and the version delayed by delay element 501 and calculates their difference. The difference signal output from the subtractor 511 is input into the transient detector 701.

The result of the determination by transient detector 701 is used to control the switch 702. As noted above, switch 702 is arranged in the feedback circuit to receive the signal output form multiplier 511 and the signal output from delay element 510, as well as a control signal from transient detector 701. If transient detector 701 determines that there has been a transient on the input signal, the control signal output from transient detector 701 controls switch 702 to be in the uppermost position shown in FIG. 7 so that the input to adder 509 from the feedback circuit is a signal with VFF compensation applied to it.

Alternatively, if the transient detector 701 determines that there has not been a transient on the input signal, the control signal output from transient detector 701 controls switch 702 to be in the lowermost position shown in FIG. 7 so that the output of delay element 510 is fed to the input of the adder 509 without a VFF compensation signal applied to it. Accordingly, with switch 702 in the lowermost position, the adder 509 receives from the feedback circuit a delayed version of the digital control signal output from the duty cycle control unit.

Therefore, a VFF compensation signal calculated from the current input signal of the SMPS is applied to the signal input to adder 509 from the feedback circuit only when a transient has been detected on the input voltage of the SMPS.

In the embodiment shown in FIG. 7, the VFF compensation signal is calculated for every sample of the input signal and the VFF compensation signal is combined within the feedback circuit when a transient has been detected. However, in an alternative implementation, the computation unit 502 (and, in a further implementation, multiplier 511) is controlled by the output of the transient detector 701 such that the computation of the VFF compensation signal is performed only when a transient has been detected on the input signal. This further reduces the power-consumption and computational requirements of the digital control unit. In addition, this allows switch 702 to be omitted.

Figure 8:
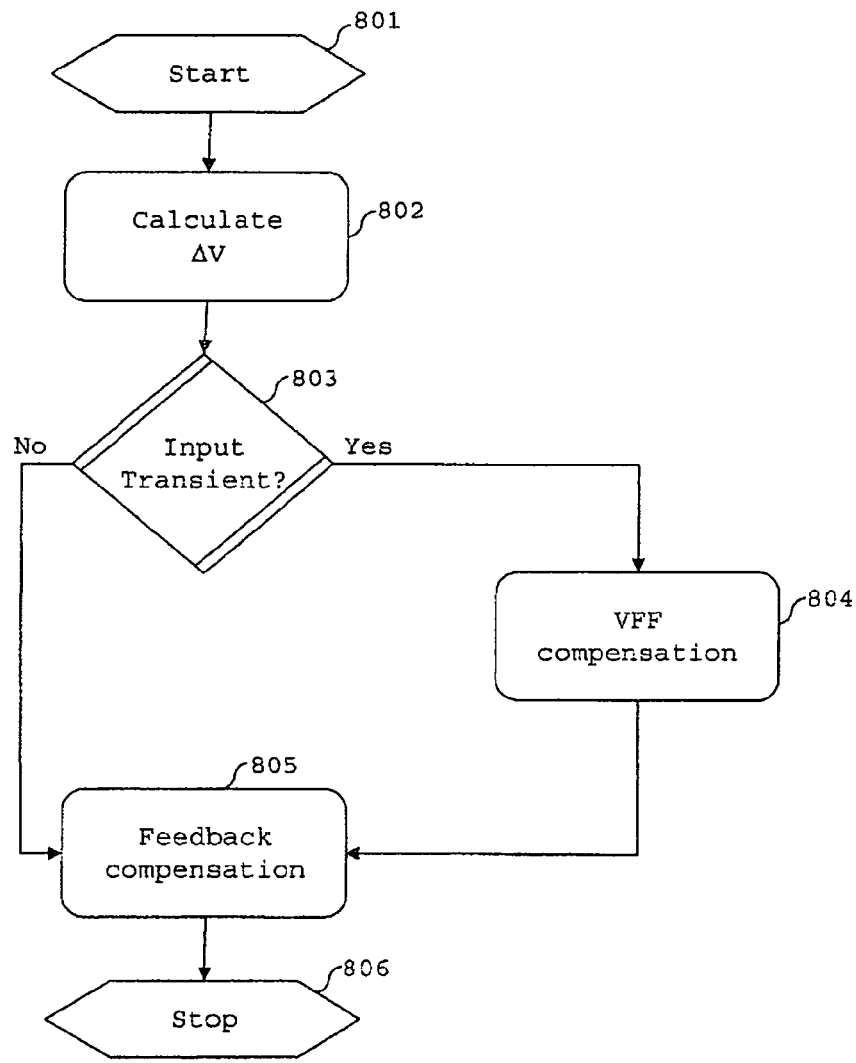
FIG. 8 is a flow chart of processes performed by the first embodiment.

FIG. 8 is a flow chart showing the transient detection operation process according to the first embodiment of the invention.

In step 802, the voltage of the current measured input signal of the SMPS is compared to the voltage of a previous measured input signal of the SMPS to generate a difference signal representing the voltage difference between current and previous measured input signals.

The process then proceeds to step 803, at which the difference signal is used to determine if a transient has occurred. The processing performed at step 803 is the same as that previously described above with reference to FIG. 5, and accordingly, it will not be described again here.

If the result of step 803 is that a transient has occurred, the process proceeds to steps 804 and 806. In steps 804 and 805 a digital control signal is calculated as previously described.

On the other hand, if the result of step 803 is that a transient has not occurred, the process proceeds to step 805, omitting step 804, so that feedback compensation is performed using a delayed version of the duty cycle control signal without VFF compensation.

The first embodiment therefore allows the calculation of either a digital control signal with just feedback control or a compensated digital control signal with VFF compensation applied within the feedback control.

This is inherently more efficient than the known system shown in FIG. 1 wherein VFF compensation is calculated and applied for every input sample, even when there has been no transient on the input voltage and there is no need to calculate and apply a VFF compensation signal.

Second Embodiment

The second embodiment of the invention differs from the first embodiment in the way in which the VFF compensation signal is calculated and applied.

In the second embodiment, the calculated VFF compensation signal is an approximation of the VFF compensation given in Equation 7.

An advantage of the second embodiment over the previous embodiment of the invention is that the division operation performed by computation block 502 in FIG. 7 is avoided and this significantly simplifies the computational requirements of the digital control unit.

Defining the change in input voltage $\Delta V$ as:

$$V_{in-new} = V_{in-old} - \Delta V \quad \text{Equation 12}$$

An approximate VFF compensation signal can be obtained using the updated duty cycle:

$$D_{new} = D_{old}(1 + \Delta VG) \quad \text{Equation 13}$$
$$= D_{old} + D_{old}\Delta VG$$

In Equation 13, the new duty cycle, $D_{new}$, is changed with a factor $(1+\Delta VG)$. The change in the input voltage $\Delta V$ is scaled with a factor G. The output voltage becomes:

$$V_{out} = V_{in-new}D_{new} \quad \text{Equation 14}$$
$$= (V_{in-old} - \Delta V)D_{old}(1 + \Delta VG)$$
$$= D_{old}V_{in-old} - D_{old}\Delta V +$$
$$D_{old}\Delta VGV_{in-old} - D_{old}G(\Delta V)^2$$

Assuming that the gradient in the input voltage is small, the term $D_{old}G(\Delta V)^2$ can be neglected.

The two middle terms of Equation 14 are eliminated and the output voltage becomes almost unchanged if G is chosen as:

$$G = \frac{1}{V_{in-old}} \quad \text{Equation 15}$$

The division in Equation 15 need not be applied for every sample if it is approximated to a constant gain factor. By choosing a constant G based upon a fixed value of $V_{in-old}$ in the range $V_{in-min} \leq V_{in-old} \leq V_{in-max}$, where $V_{in-min}$ is the minimum measured input voltage and $V_{in-max}$ is the maximum measured input voltage, yields a good approximation in practice.

Figure 9:
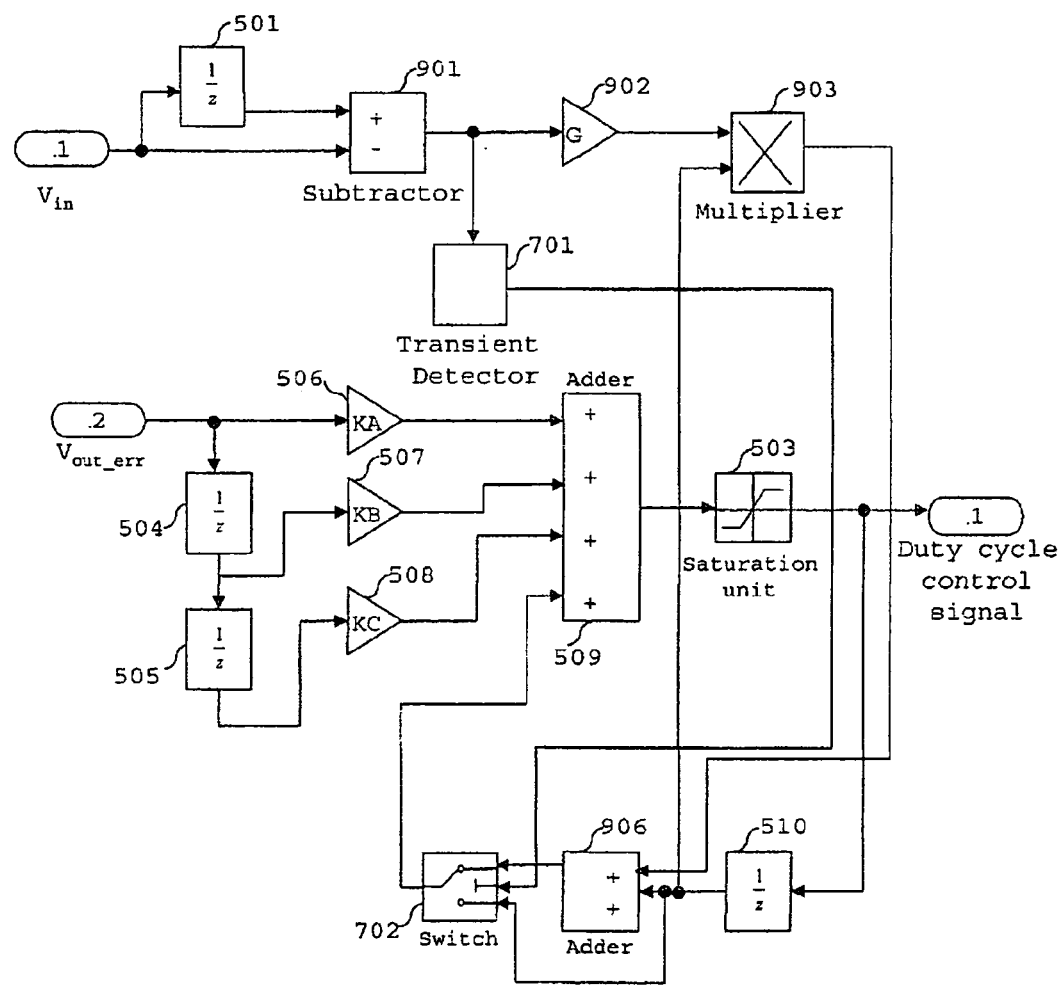
FIG. 9 is a diagram of a digital control unit according to a second embodiment of the invention.

A digital control unit according to the second embodiment of the invention is shown in FIG. 9.

The digital control unit implementation in FIG. 9 differs from that of the first embodiment, shown in FIG. 7, in the way that the VFF compensation signal is generated and combined within the feedback circuit to the integral input of the adder. To avoid repetition, previously described components of the digital control unit according to the first embodiment that are common to the second embodiment are not described again here.

The current measured input voltage value of the SMPS received on input 1 and a delayed version thereof are input into a subtractor 901 that calculates a difference between the current and delayed versions of the measured input voltage. The difference signal output from the subtractor 901 is input to an amplifier, or multiplier, 902 that amplifies, or multiplies, it with a constant gain G. The gain G is calculated in accordance with Equation 15.

The output from the amplifier 902 is fed to the first input of a multiplication unit 903. The second input to the multiplication unit 903 is the output of the delay element 510.

The output of the multiplier 903 is the VFF compensated signal, which is then fed to a first input of an adder 906. A second input to adder 906 is the output of the delay element 510. The output of adder 906 is fed to one of the inputs of switch 702. The other input of switch 702 is the output from the delay element 510 (as in the first embodiment). The output of switch 702 is the output of the feedback circuit and is fed to an input of adder 509 (as in the first embodiment).

The transient detector 701 is as previously described.

The switch 702 is controlled by the output of the comparator 905 so that the VFF compensation is applied only when a transient has been detected.

Advantageously, the VFF compensation signal calculation of the second embodiment does not involve a division. A computationally demanding division operation or the use of a look-up table is therefore avoided.

In an alternative implementation of the digital control unit of FIG. 9, the amplifier 902 is controlled by the comparator 905 such that the computation of the VFF compensation signal is performed only when a transient has been detected on the input signal. This reduces the power-consumption and computational requirements of the digital control unit. In addition, this allows switch 702 to be omitted and for the output of adder 906 to be input directly to adder 509.

Third Embodiment

In a third embodiment of the invention, a different circuit from the second embodiment is used to calculate and apply the VFF compensation signal.

From Equation 13, it is clear that the duty cycle is updated with a gain factor, C.

$$D_{new} = D_{old}(1 + \Delta VG) \quad \text{Equation 16}$$
$$= D_{old} \cdot C$$

where, $$C = 1 + \Delta VG$$

The gain G is calculated as shown in Equation 15 and, as described for Equation 15, can be approximated to a constant.

A digital control unit according to the third embodiment which controls the duty cycle in accordance with Equation 16 is shown in FIG. 10.

The digital control unit of the third embodiment differs from the second embodiment in that the multiplier 903 has been replaced with an adder 1101 and a constant value generator 1102, and adder 906 has been replaced by multiplier 511.

In the third embodiment, the output of amplifier 902 is input to adder 1101. Constant value generator 1102 generates and outputs a constant value (which comprises the value "1" in this embodiment, but may comprise another value). The output of the constant value generator is input to adder 1101.

The output of adder 1101 is input to multiplier 511. The other input to multiplier 511 is the output from delay element 510.

The output of multiplier 511 is input to adder 509,

The output signal from adder 1101 is the VFF compensation signal and is equivalent to the gain factor C. In an alternative implementation, the VFF compensation signal is generated by a look-up table that stores a value of C for each value of the difference signal output from subtractor 901.

The present embodiment is preferable when implementing integrated VFF compensation on a direct form 1, direct form 2 or transposed direct designs of feedback unit and a signal in the feedback circuit is multiplied by the VFF compensation signal.

When there is no input voltage transient, multiplier 511 multiplies the output of delay element 510 by one.

When an input transient occurs, the output of delay element 510 is multiplied by the gain factor C of Equation 16.

The transient detector 701 is as described previously.

The result of the transient detection may be used as shown in FIG. 10 to control the amplifier 902 such that a new VFF compensation signal is only generated when a transient is detected.

Alternatively, the transient detector 701 may control a switch that is provided in the feedback circuit. A suitable arrangement is that shown in FIG. 7 for switch 702. The inputs of the switch are the outputs of multiplier 511 and delay element 510. The output of the switch is the input to adder 509 from the feedback circuit.

Accordingly, when a transient is detected, the output of multiplier 511 is input to adder 509. When no transient as detected, the output of delay element 510 is input directly to adder 509.

Fourth Embodiment

According to a fourth embodiment of the invention, an approximation of the VFF compensation signal given in Equation 7 is calculated so that a digital control unit with lower processing requirements is realised.

The approximate VFF compensation signal of the fourth embodiment is obtained using the updated duty cycle shown below:

$$D_{new} = D_{old} + \Delta VK \quad \text{Equation 17}$$

The output voltage becomes:

$$V_{out} = D_{new} V_{in-new} \quad \text{Equation 18}$$
$$= (D_{old} + \Delta VK)(V_{in-old} - \Delta V)$$
$$= D_{old} V_{in-old} - D_{old} \Delta V + \Delta VK V_{in-old} - K(\Delta V)^2$$

If the gradient of the input signal is small, the term $K(\Delta V)^2$ can be neglected. The two middle terms of Equation 18 are eliminated and the output voltage becomes almost unchanged if:

$$K = \frac{D_{old}}{V_{in-old}} \quad \text{Equation 19}$$

Using Equation 5, replacing the old duty cycle with the ideal duty cycle gives:

$$K = \frac{V_{out-old}}{V_{in-old}^2} \quad \text{Equation 20}$$
$$= \frac{V_{out-nom}}{V_{in-old}^2}$$

$V_{out-nom}$ is typically the desired output voltage of the SMPS but it could alternatively be a previous measured output voltage.

In order to avoid the division, a constant factor K is preferable. In practice, the inventors have found that choosing a constant $V_{in-old}$ in the range $V_{in-min} \leq V_{in-old} \leq V_{in-max}$ will yield a good approximation. The factor K assumes that the duty cycle is in the range [0, 1]. If another number range is used then scaling will need to be applied.

A multiplierless realization is obtained by implementing the scale factor K as an arithmetic shift.

$$K = 2^N, \quad \text{Equation 21}$$

where, $$N = \log_2\left(\frac{V_{out-nom}}{V_{in-old}^2}\right)$$

An improved approximation to the ideal factor K can be obtained by using several shifts and additions/subtractions using Canonic Sign Digit Code of the constant K. The calculation, that is performed by a multiplierless shift operation unit, minimizes the number of add/sub operations. Operations with Canonic Sign Digit Code are described for example in U.S. Pat. No. 7,239,257 B1.

Figure 11:
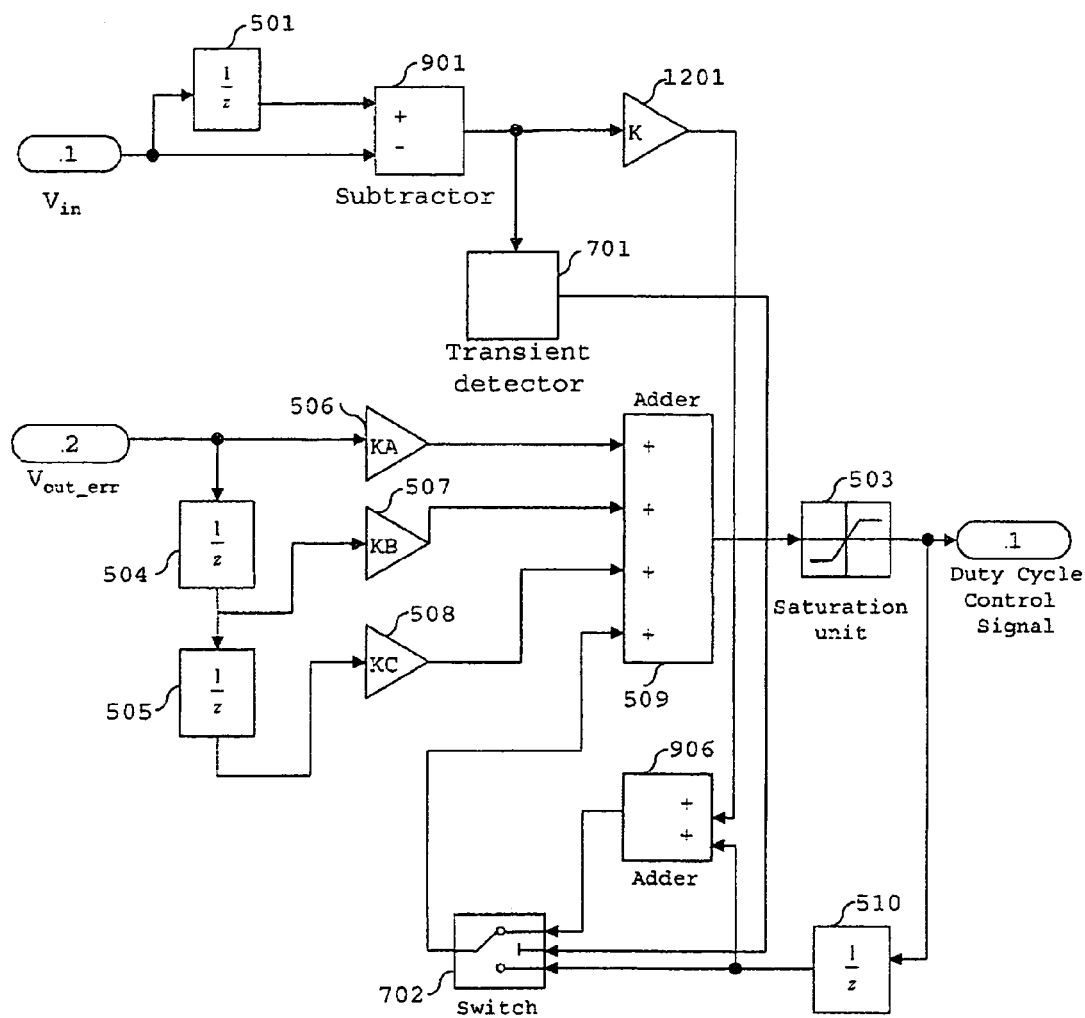
FIG. 11 is a diagram of a digital control unit according to a fourth embodiment of the invention.

The digital control unit according to the fourth embodiment of the invention is shown in FIG. 11.

The digital control unit implementation in FIG. 11 differs from that of previous embodiments in the way that the VFF compensation signal is generated. To avoid repetition, previously described components of the digital control unit according to the third embodiment are not described again here.

In the fourth embodiment, the output of the subtractor 901 is input to an amplifier 1201 with a gain K calculated in accordance with either Equation 20 or 21.

Although described as an amplifier, amplifier 1201 may be implemented with a multiplierless shift operation unit that performs shift, addition and subtraction of operations as is known for implementations of Canonic Sign Digit Code.

The output of amplifier 1201 is fed to the input of the adder 906 which combines it with the output of delay element 510. The output of the adder 906 is fed via switch 702 to the integral input of adder 509.

As described for the first embodiment, the switch 702 is controlled by the transient detector 701 so that VFF compensation is only applied when a transient is detected.

However, in an alternative implementation of the fourth embodiment, the amplifier 1201 is controlled by the transient detector 701 such that the computation of the VFF compensation signal is performed only when a transient has been detected on the input signal. This reduces the power-consumption and computational requirements of the digital control unit. In addition, this allows switch 702 to be omitted and for the output of adder 906 to be input directly to adder 509.

Fifth Embodiment

Figure 12:
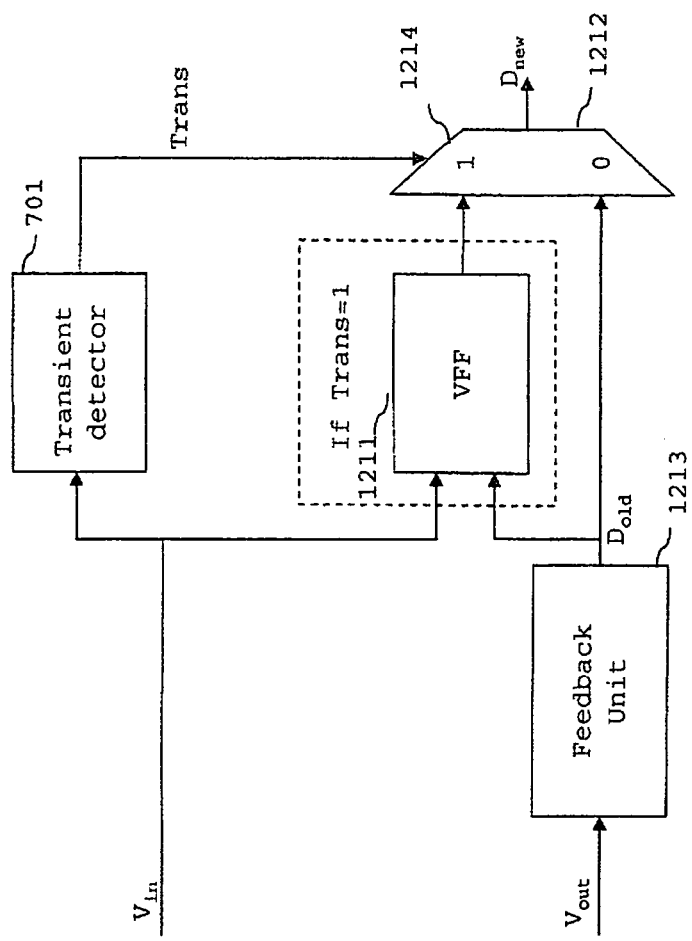
FIG. 12 is a schematic block diagram of a digital control unit according to a fifth embodiment of the invention.

FIG. 12 shows a block diagram of a fifth embodiment.

A digital control unit for an SMPS comprises a feedback unit in series with a VFF compensator The digital control unit further incorporates the above-described transient detector 701, for determining if a transient has occurred on the input signal of the SMPS, and a combiner that only applies VFF compensation to the output of the feedback unit when the transient detector 701 has detected that a transient has occurred.

In the arrangement shown in FIG. 12, the output of the transient detector 701 controls the combiner such that if the transient detector 701 detects that there has been a transient on the input signal to the SMPS, the combiner combines the output of the VFF compensator and the feedback unit.

Experimental Results

FIG. 13 shows a comparison of SMPS performance with no VFF compensator, a VFF compensator applied in cascade with the feedback unit and the VFF compensator integrated into the feedback unit according to different embodiments of the invention.

In the table of FIG. 13, the different digital control unit designs were used to suppress a 5V input step, from 5V to 10V for a nominal output voltage of 3.3V. Different typical rise times were used to examine the ability of handling different gradients.

All of the VFF compensation schemes reduced the transient overshoot and undershoot very well.

The best performance was with the VFF compensator in cascade with the feedback control circuit.

However, it is clear that all of the VFF compensation schemes according to embodiments of the invention provided acceptable performance.

Furthermore, as explained previously, the VFF compensation schemes according to embodiments of the invention in which the VFF compensator is integrated into the feedback unit have a lower power-consumption, are less computationally demanding and can be implemented with simpler hardware than digital control units according to embodiments comprising a cascade arrangement of a feedback unit and a VFF compensator.

The SMPS of the third embodiment was used to provide an isolated full-bridge DC/DC converter with a nominal output voltage of 12V, an input voltage range of 35-75V and a maximum output current of 33 A.

Figure 14:
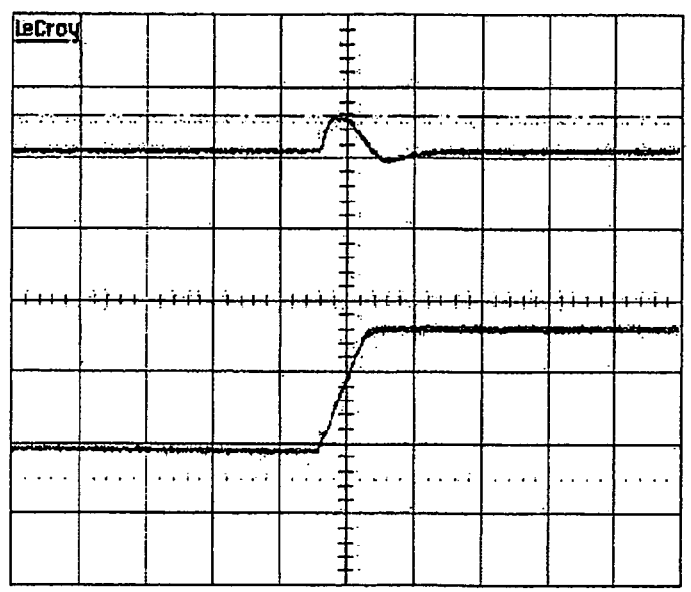
FIG. 14 shows a graphical results demonstrating the performance of an SMPS according to an embodiment of the invention.

The upper trace of FIG. 14 is displayed with 2V/div and 0.5 ms/div. The lower trace is displayed with 20V/div and 0.5 ms/div.

The lower trace of FIG. 14 shows an input voltage step from 40V to 75V during 0.5 ms.

The upper trace show the response of the output voltage. The maximum output deviation is 1V and the nominal output voltage is restored within 0.5 ms.

For comparison, without any VFF compensation, the output voltage rises from 12V to over 22V and then the overvoltage protection shuts down the converter.

Modifications and Variations

Many modifications and variations can be made to the embodiments described above.

For example, a modification to the second and third embodiments of the invention is described below.

In the second and third embodiments, the gain, G, of the amplifier 902 is calculated according to Equation 15.

In the present modification the gain, $G_m$, is alternatively calculated by:

$$G_m = \frac{V_{in-min} + V_{in-max}}{2 V_{in-min} V_{in-max}} \quad \text{Equation 22}$$

In Equation 22, $V_{in-min}$ is the minimum measured input voltage and $V_{in-max}$ is the maximum measured input voltage.

Advantageously, the above value of $G_m$ allows the approximation error to be minimised.

A modification of the fourth embodiment is described below.

In the fourth embodiment, the gain, K, of the amplifier 1201 is calculated according to Equation 20.

In the present modification the gain, $K_m$, is alternatively calculated by:

$$K_m = \frac{V_{out-old}(V_{in-min}^2 + V_{in-max}^2)}{2V_{in-min}^2 V_{in-max}^2} \quad \text{Equation 23}$$
$$= \frac{V_{out-nom}(V_{in-min}^2 + V_{in-max}^2)}{2V_{in-min}^2 V_{in-max}^2}$$

$V_{out-nom}$ is typically the desired output voltage of the SMPS but it could alternatively be a previous measured output voltage.

The factor K assumes that the duty cycle is in the range [0, 1]. If another number range is used then scaling will need to be applied.

As previously described for the fourth embodiment, a multiplierless realization is obtained by implementing the scale factor K as an arithmetic shift.

An improved approximation to the ideal factor K can be obtained by using several shifts and additions/subtractions using Canonic Sign Digit Code of the constant K. The calculation, that is performed by a multiplierless shift operation unit, minimizes the number of add/sub operations. Operations with Canonic Sign Digit Code are described for example in U.S. Pat. No. 7,239,257 B1.

The above described modification improves the accuracy of the approximation algorithm.

The foregoing description of embodiments of the invention has been presented for the purpose of illustration and description. It is not intended to be exhaustive or to limit the invention to the precise form disclosed. Alternations, modifications and variations can be made without departing from the spirit and scope of the present invention.

The invention claimed is:

1. A digital control unit for controlling a duty cycle of a switched mode power supply, the digital control unit comprising:
    a feedback unit operable to calculate a digital control signal for controlling a duty cycle of the switched mode power supply;
    a voltage feed forward compensation signal generator operable to calculate a compensation signal for adjusting the digital control signal in dependence upon an input signal of the switched mode power supply; and
    a transient detector operable to detect a transient on the input signal of the switched mode power supply;
        wherein the digital control unit is responsive to the detection of a transient by the transient detector to adjust the digital control signal for controlling the duty cycle of the switched mode power supply in accordance with the compensation signal; and the transient detector comprises:
            an input arranged to receive a difference signal that represents a difference between consecutive values of the input signal to the switched mode power supply;
            a first comparator operable to detect that a positive transient on the input signal has occurred if the difference signal is greater than a positive threshold level;
            a second comparator operable to determine if the difference signal is within a predetermined range of positive values and output a result that indicates if the difference signal is within the predetermined range of positive values;
            a first calculator operable to detect that a positive transient on the input signal has occurred if, out of a first predetermined number of consecutive results of the output of the second comparator, there is at least a second predetermined number of results indicating that the difference signal is within the predetermined range of positive values;
            a third comparator operable to detect that a negative transient on the input signal has occurred if the difference signal is less than a negative threshold level;
            a fourth comparator operable to determine if the difference signal is within a predetermined range of negative values and output a result that indicates if the difference signal is within the predetermined range of negative values; and,
            a second calculator operable to detect that a negative transient on the input signal has occurred if, out of a third predetermined number of consecutive results of the output of the fourth comparator, there is at least a fourth predetermined number of results indicating that the difference signal is within the predetermined range of negative values.

2. The digital control unit according to claim 1, wherein the transient detector further comprises a third calculator operable to receive output signals from the first comparator, first calculator, third comparator and second calculator, and to output a signal indicating that a transient has occurred if at least one of the output signals from the first comparator, first calculator, third comparator and second calculator indicate that a transient has occurred.

3. The digital control unit according to claim 1, wherein the first, second, third and fourth comparators are arranged in parallel with each other.

4. The digital control unit according to claim 1, the digital control unit further comprising:
    a combiner operable to combine the compensation signal and the digital control signal to calculate a compensated digital control signal; wherein the combiner is operable to output one of the digital control signal or the compensated digital control signal in dependence upon the detection of a transient by the transient detector.

5. The digital control unit according to any of claim 1, wherein the feedback unit comprises:
    an adder with at least a first input arranged to receive a signal dependent upon an output voltage of the switch mode power supply, a second input arranged to receive a signal from a feedback circuit, and an output arranged to output an output signal comprising the sum of the signals applied to the inputs;
    an output arranged to output a digital control signal for controlling the duty cycle of the switched mode power supply, wherein the digital control signal is dependent upon the output signal from the adder;
    a feedback circuit arranged between the output of the adder and the second input of the adder and arranged to calculate a compensated feedback signal by combining the compensation signal with a signal dependent upon the output of the adder and to feed the compensated feedback signal to the second input of the adder; and, a switch operable to switch the feedback circuit between a first state, in which the signal input to the second input of the adder is dependent upon a combination of the compensation signal calculated in dependence upon the current input voltage of the switched mode power supply and the signal dependent upon the output of the adder, and a second state, in which the signal input to the second input of the adder is dependent upon the output of the adder but not dependent upon a compensation signal calculated in dependence upon the current input voltage;

wherein the transient detector is arranged to control the switch in dependence upon the result of the transient determination thereby, such that the switch switches the feedback circuit into the first state when a transient is detected on the input voltage and the second state when no transient is detected on the input voltage.

6. The digital control unit according to claim 5, wherein the voltage feed forward compensation signal generator comprises:

a delay element arranged to generate a delayed version of a signal representing the input voltage of the switched mode power supply;

a subtractor arranged to receive current and delayed versions of the signal representing the input voltage and to generate a difference signal representing a difference between the delayed and current versions of the signal representing the input voltage;

a multiplier operable to multiply the difference signal by a gain G; and, a second adder operable to add the output of the multiplier with a constant value to generate the compensation signal;

wherein the gain G of the first multiplier is a constant and is determined as:

$$G_m = \frac{V_{in-min} + V_{in-max}}{2V_{in-min}V_{in-max}}$$

where Vin-min is the minimum measured input voltage, and Vin-max is the maximum measured input voltage.

7. The digital control unit according to claim 5, wherein the voltage feed forward compensation signal generator comprises:

a delay element arranged to generate a delayed version of a signal representing the input voltage of the switched mode power supply;

a subtractor arranged to receive current and delayed versions of the signal representing the input voltage and to generate a difference signal representing a difference between the delayed and current versions of the signal representing the input voltage; and, a multiplierless shift operation unit operable to apply a gain K to the difference signal to generate the compensation signal;

wherein the gain K of the multiplierless shift operation unit is a constant and determined as:

$$K_m = \frac{V_{out-old}(V_{in-min}^2 + V_{in-max}^2)}{2V_{in-min}^2 V_{in-max}^2}$$
$$= \frac{V_{out-nom}(V_{in-min}^2 + V_{in-max}^2)}{2V_{in-min}^2 V_{in-max}^2}$$

where Vin-min is the minimum measured input voltage, Vin-max is the maximum measured input voltage, and Vout-nom is either set in dependence upon a previous measured output voltage or a desired output voltage.

8. A method of controlling a duty cycle of a switched mode power supply, the method comprising:

calculating a digital control signal for controlling a duty cycle of the switched mode power supply;

calculating a compensation signal for adjusting the digital control signal in dependence upon an input signal of the switched mode power supply;

detecting a transient on the input signal of the switched mode power supply; and adjusting, in dependence upon the detection of a transient, the digital control signal for controlling the duty cycle of the switched mode power supply in accordance with the compensation signal;

wherein the process of detecting a transient comprises processing a difference signal that represents a difference between consecutive values of the input signal to the switched mode power supply by:

performing a first positive transient detection process comprising detecting that a positive transient on the input signal has occurred if the difference signal is greater than a positive threshold level;

performing a second positive transient detection process comprising determining if the difference signal is within a predetermined range of positive values, outputting a result that indicates if the difference signal is within the predetermined range of positive values, and detecting that a positive transient on the input signal has occurred if, out of a first predetermined number of consecutive said results, there is at least a second predetermined number of results indicating that the difference signal is within the predetermined range of positive values;

performing a first negative transient detection process comprising detecting that a negative transient on the input signal has occurred if the difference signal is less than a negative threshold level;

performing a second negative transient detection process comprising determining if the difference signal is within a predetermined range of negative values, outputting a result that indicates if the difference signal is within the predetermined range of negative values, and detecting that a negative transient on the input signal has occurred if, out of a third predetermined number of consecutive said results there is at least a fourth predetermined number of results indicating that the difference signal is within the predetermined range of negative values.

9. The method according to claim 8, wherein the method further comprises the process of receiving outputs from the first positive transient detection process, second positive transient detection process, first negative transient detection process and second negative transient detection process, and outputting a signal indicating that a transient has occurred if at least one of the outputs from the first positive transient detection process, second positive transient detection process, first negative transient detection process and second negative transient detection process indicate that a transient has occurred.

10. The method according to claim 8, wherein the first positive transient detection process, second positive transient detection process, first negative transient detection process and second negative transient detection process are arranged in parallel with each other.

11. The method according to claim 8, further comprising:
   combining the compensation signal and the digital control signal to calculate a compensated digital control signal; and,
   outputting one of the digital control signal and the compensated digital control signal in dependence upon the detection of a transient.

12. The method according to claim 8, wherein the process of calculating a digital control signal for controlling a duty cycle of the switched mode power supply comprises:
   measuring an input voltage and an output voltage of the switched mode power supply;
   adding a first input signal dependent upon an output voltage of the switched mode power supply with a second signal comprising a previously calculated compensated feedback signal to generate a summation signal comprising the sum of the first and second signals;
   outputting a digital control signal to the switched mode power supply to control the duty cycle thereof such that the digital control signal is dependent upon the summation signal;
   calculating a compensated feedback signal by combining the compensation signal with a signal dependent upon the summation signal; and,
   switching between a first state, in which said previously calculated compensated feedback signal is dependent upon a combination of a compensation signal generated in dependence upon the current input voltage of the switched mode power supply and a signal dependent upon the summation signal, and a second state, in which said previously calculated compensated feedback signal is dependent upon a signal dependent upon the summation signal but not dependent upon a compensation signal generated in dependence upon the current input voltage of the switched mode power supply;
      wherein the switching between the first and second states is controlled in dependence upon the result of the transient detection such that the digital control signal is calculated in the first state when a transient is detected and the digital control signal is calculated in the second state when a transient is not detected.

13. The method according to claim 12, wherein the process of calculating a compensated feedback signal comprises multiplying said compensation signal with a signal dependent upon said summation signal; and the process of calculating a compensation signal comprises:
   delaying a signal that is dependent upon the input voltage of the switched mode power supply;
   generating a difference signal by subtracting the current version of the signal representing the input voltage from the delayed version of thereof; and,
   amplifying the difference signal with a gain G; and adding said amplified difference signal to a constant value to generate the compensation signal; wherein the gain G is a constant and is determined as:

$$G_m = \frac{V_{in-min} + V_{in-max}}{2V_{in-min}V_{in-max}}$$

where Vin-min is the minimum measured input voltage and Vin-max is the maximum measured input voltage.

14. The method according to claim 12, wherein:
   the process of calculating a compensated feedback signal comprises adding said compensation signal with a signal dependent upon said summation signal; and,
   the process of generating a compensation signal comprises:
      delaying a signal that is dependent upon the input voltage of the switched mode power supply;
      generating a difference signal by subtracting the current version of the signal representing the input voltage from the delayed version of thereof; and,
      amplifying the difference signal with a gain K to generate the compensation signal; wherein, the gain K is a constant and is determined as:

$$K_m = \frac{V_{out-old}(V_{in-min}^2 + V_{in-max}^2)}{2V_{in-min}^2 V_{in-max}^2}$$

$$= \frac{V_{out-nom}(V_{in-min}^2 + V_{in-max}^2)}{2V_{in-min}^2 V_{in-max}^2}$$

where Vin-min is the minimum measured input voltage, Vin-max is the maximum measured input voltage, and Vout-nom is either set in dependence upon a previous measured output voltage or desired output voltage.

* * * * *

UNITED STATES PATENT AND TRADEMARK OFFICE
CERTIFICATE OF CORRECTION

PATENT NO. : 8,451,038 B2
APPLICATION NO. : 13/388578
DATED : May 28, 2013
INVENTOR(S) : Karlsson et al.

It is certified that error appears in the above-identified patent and that said Letters Patent is hereby corrected as shown below:

In the Specifications:

In Column 5, Line 26, delete "isolated." and insert -- isolated --, therefor.

In Column 8, Line 32, delete "comparator 405" and insert -- comparator 406 --, therefor.

In Column 9, Line 36, delete "$PosSle_{min}$" and insert -- $PosSlew_{min}$ --, therefor.

In Column 9, Line 42, delete "$X_7$," and insert -- $X_2$, --, therefor.

In Column 10, Line 12, delete "equal" and insert -- equal to --, therefor.

In Column 12, Line 13, delete "KO" and insert -- KC --, therefor.

In Column 15, Line 64, delete "509," and insert -- 509. --, therefor.

In Column 16, Line 24, delete "transient as" and insert -- transient is --, therefor.

In the Claims:

In Column 20, Line 50, in Claim 5, delete "to any of" and insert -- to --, therefor.

In Column 24, Line 10, in Claim 13, delete "wherein" and insert -- wherein, --, therefor.

Signed and Sealed this
Fifteenth Day of October, 2013

Teresa Stanek Rea
*Deputy Director of the United States Patent and Trademark Office*